(12) United States Patent
Risi et al.

(10) Patent No.: US 9,062,799 B2
(45) Date of Patent: Jun. 23, 2015

(54) DEVICE FOR PROTECTING AT LEAST ONE PIPE LOCATED AT THE BOTTOM OF A BODY OF WATER, AND ASSOCIATED FLUID TRANSPORT ASSEMBLY

(75) Inventors: Paul Risi, Bois le Roi (FR); Philippe Espinasse, Bihorel (FR); Jean-Pascal Biaggi, La Celle Saint Cloud (FR)

(73) Assignee: TECHNIP FRANCE (FR)

( * ) Notice: Subject to any disclaimer, the term of this patent is extended or adjusted under 35 U.S.C. 154(b) by 307 days.

(21) Appl. No.: 13/318,167

(22) PCT Filed: Apr. 28, 2010

(86) PCT No.: PCT/FR2010/050811
§ 371 (c)(1),
(2), (4) Date: Apr. 4, 2012

(87) PCT Pub. No.: WO2010/125311
PCT Pub. Date: Nov. 4, 2010

(65) Prior Publication Data
US 2012/0183356 A1 Jul. 19, 2012

(30) Foreign Application Priority Data
Apr. 30, 2009 (FR) ...................................... 09 52922

(51) Int. Cl.
*F16L 1/24* (2006.01)
*F16L 1/12* (2006.01)
*F16L 1/20* (2006.01)

(52) U.S. Cl.
CPC .. *F16L 1/123* (2013.01); *F16L 1/20* (2013.01)

(58) Field of Classification Search
USPC ........... 405/158, 159, 162, 172, 184.1, 184.4, 405/211; 285/45, 64; 441/133
See application file for complete search history.

(56) References Cited

U.S. PATENT DOCUMENTS

| 2,373,439 | A | * | 4/1945 | Wheatley | 138/178 |
| 2,518,981 | A | * | 8/1950 | Edwards | 138/178 |
| 2,662,552 | A | * | 12/1953 | Rowe et al. | 138/178 |

(Continued)

FOREIGN PATENT DOCUMENTS

| AU | 642965 B2 | 11/1993 |
| CN | 201043642 Y * | 4/2008 |

(Continued)

OTHER PUBLICATIONS

International Search Report dated Aug. 24, 2010, issued in corresponding international application No. PCT/FR2010/050811.

*Primary Examiner* — Benjamin Fiorello
*Assistant Examiner* — Kyle Armstrong
(74) *Attorney, Agent, or Firm* — Ostrolenk Faber LLP

(57) ABSTRACT

A device including a plurality of disconnected ballast elements (24) for a pipe (16). Each ballast element (24) has a lower surface (34) to be laid at the bottom (12) of a body of water (14) and an upper surface (32) delimiting at least one concave trough (38) for supporting the pipe (16A, 16B). A top cover (26) for protecting the pipe and connecting at least two disconnected ballast elements (24) so as to cover the pipe (16A, 16B) between the ballast elements (24). The cover (26) extends opposite the trough (38) and delimits, together with the upper surfaces (32) of each ballast element (24), a passage for receiving the pipe (16A, 16B).

13 Claims, 4 Drawing Sheets

(56) References Cited

U.S. PATENT DOCUMENTS

| | | | |
|---|---|---|---|
| 3,240,512 A | | 3/1966 | Pennington et al. |
| 4,338,045 A | * | 7/1982 | Cour .............................. 405/172 |
| 5,343,942 A | * | 9/1994 | Del Serra et al. ............ 166/66.4 |
| 6,206,613 B1 | * | 3/2001 | Elkins ........................... 405/157 |
| 6,439,808 B1 | * | 8/2002 | Smidt et al. ................... 405/172 |

FOREIGN PATENT DOCUMENTS

| | | | |
|---|---|---|---|
| EP | 466219 A1 | * | 1/1992 |
| FR | 2400657 | | 3/1979 |
| GB | 1393176 A | | 5/1975 |
| GB | 2002870 | | 2/1979 |
| GB | 2190168 A | * | 11/1987 |

* cited by examiner

DEVICE FOR PROTECTING AT LEAST ONE PIPE LOCATED AT THE BOTTOM OF A BODY OF WATER, AND ASSOCIATED FLUID TRANSPORT ASSEMBLY

CROSS-REFERENCE TO RELATED APPLICATIONS

The present application is a 35 U.S.C. §§371 national phase conversion of PCT/FR2010/050811, filed Apr. 28, 2010, which claims priority of French Application No. 0952922, filed Apr. 30, 2009, the contents of which are incorporated by reference herein. The PCT International Application was published in the French language.

BACKGROUND OF THE INVENTION

The present invention relates to a device for protecting at least one pipe located at the bottom of a body of water, comprising a plurality of disconnected ballast elements for the pipe, each ballast element having a lower surface intended to be placed on the bottom of a body of water and an upper surface defining at least one trough for supporting the pipe.

Such a device is in particular applicable to the protection of fluid transport pipes laid at the bottom of a body of water, such as a sea, an ocean or a lake.

The pipe is intended in particular to transport a fluid, such as hydrocarbons, gases, or mixtures and gases and fluids, for example, between a wellhead situated on the bottom of the body of water and a convergence zone where several pipes come together. The fluids collected in the convergence zone rise toward a surface facility via one or more riser pipes.

Offshore hydrocarbon production fields are known that comprise a multitude of wellheads and therefore a large number of transport pipes extending on the sea bottom.

It is therefore sometimes necessary to immobilize said pipes relative to each other on the sea bottom, to prevent them from moving under the effect of underwater currents and to prevent them from damaging the neighboring pipes or the underwater equipment.

To that end, it is known to provide the pipe with passive ballast elements that make it possible to stabilize the position of the pipe on the sea bottom, using the foundry weight of the ballast elements.

These ballast elements are for example made up of a concrete covering surrounding the entire length of the pipe or annular concrete elements distributed at intervals along the pipe, as described for example in French application FR-A-2 400 657, or in U.S. Pat. No. 3,240,512.

Such a device has a very large mass, however, which complicates the handling and installation of the pipe at the bottom of the body of water.

Furthermore, such a device ensures only partial protection of the pipe, in particular against impacts caused by falling objects or underwater operations.

This protection may prove necessary, however, in particular in the context of the transportation of cryogenic liquids, such as liquefied natural gases (LNG), which are kept at a temperature near −160° C.

In that case, the pipes used have a dual insulating housing, the integrity of which must be protected to ensure completely safe transport of the fluid.

SUMMARY OF THE INVENTION

One aim of the invention is therefore to provide a device for protecting a pipe located at the bottom of a body of water that is easy to install and has a low mass, while offering good protection of the pipe.

To that end, the invention relates to a device of the aforementioned type, characterized in that the device also comprises a top cover for protecting the pipe connecting at least two disconnected ballast elements so as to cover the pipe between the ballast elements, the cover extending opposite the trough and delimiting, with the upper surface of each ballast element, a passage for receiving the pipe.

The device according to the invention may comprise one or more of the following features, considered alone or according to all technically possible combinations:
  at least two ballast elements bear means for fixing the cover on the ballast elements;
  the cover substantially assumes a cylinder section shape with the concavity oriented downwards;
  the cover has a lower surface with a minimum curve radius larger than the maximum curve radius of the upper surface of the ballast element opposite the trough;
  the cover defines, between two adjacent ballast elements, at least one volume downwardly clear in the absence of a pipe;
  the lower surface of at least one ballast element has a curved portion with its convexity oriented downwards;
  the curved portion has a central region substantially parallel to an immobilization axis of the pipe in the ballast element and at least one peripheral region tilted toward the upper surface moving away from the central region;
  at least one ballast element is made with a base of a first material, advantageously concrete, the cover being made with a base of a second material, advantageously a plastic, metallic or composite material;
  the upper surface of each ballast element delimits at least two troughs intended each to support a distinct pipe, the device comprising, opposite each trough, a top cover for protecting the pipe connecting at least two disconnected ballast elements to cover the pipe between the ballast elements, the cover extending opposite the trough; and
  the cover has a plurality of cover elements arranged end to end, each cover element having an upstream end supported by a first ballast element, and a downstream end supported by a second ballast element adjacent to the first ballast element.

The invention also relates to a fluid transport assembly on the bottom of a body of water characterized in that it comprises:
  at least one rigid fluid transport pipe; and
  a protective device as defined above, the pipe being placed in the receiving passage between the cover and each ballast element, bearing on each ballast element.

The transport assembly according to the invention can comprise one or more of the following features, considered alone or according to all technically possible combinations:
  the pipe is pressed on the upper surface while being inserted into each trough, the cover being positioned spaced away from the pipe; and
  the cover angularly upwardly covers the pipe over an angular sector with an angle greater than 90°, advantageously an angle substantially equal to 180° around the axis of the pipe.

The invention will be better understood upon reading the following description, provided solely as an example, and done in reference to the appended drawings, in which:

DESCRIPTION OF PREFERRED EMBODIMENTS

Hereafter, the terms "upstream" and "downstream" generally refer to the normal direction of circulation of a fluid.

FIGS. 1 to 4 illustrate a first fluid transport assembly 10 according to the invention resting on the bottom 12 of a body of water 14. Said assembly 10 is completely submerged under the surface of the body of water 14.

The body of water 14 is for example a lake, a sea, or an ocean. It has a water depth, considered between the bottom and the surface at the assembly 10, for example greater than 15 m and in particular comprised between 30 m and 3500 m.

The transport assembly 10 is intended to convey a fluid, in particular hydrocarbons, between a production assembly (not shown) situated on the bottom 12 of the body of water 14 upstream of the transport assembly 10, and a convergence zone (not shown), situated downstream of the transport assembly 10, from which the fluid is transported to the surface of the body of water 14.

The transport assembly 10 comprises at least one fluid transport pipe 16A, 16B, and a protection device 18 for the or each pipe 16A, 16B according to the invention.

Figure 1:
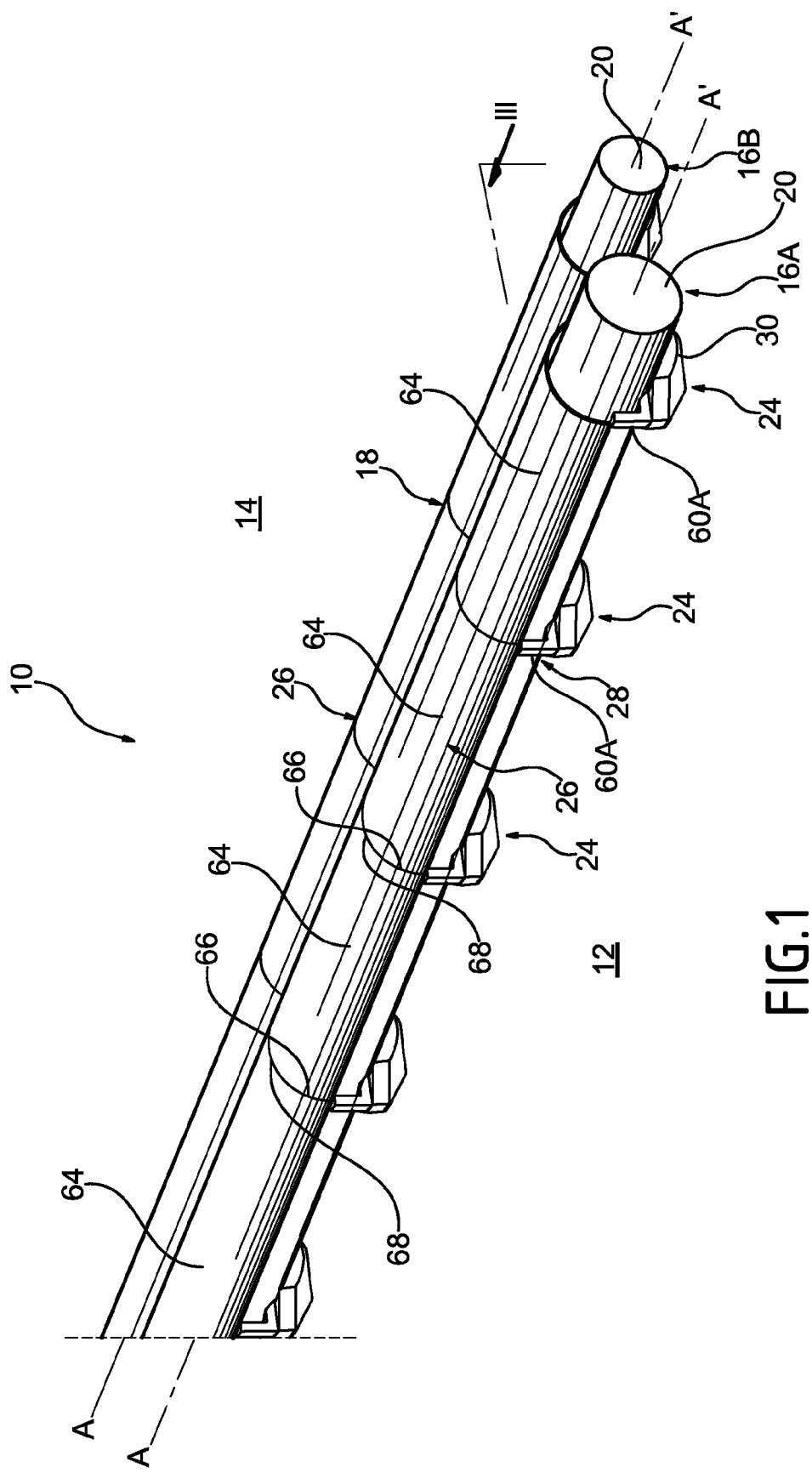
FIG. 1 is a three-quarters frontal partial perspective view of a first transport assembly according to the invention comprising a protection device placed on the bottom of a body of water.
Figure 2:
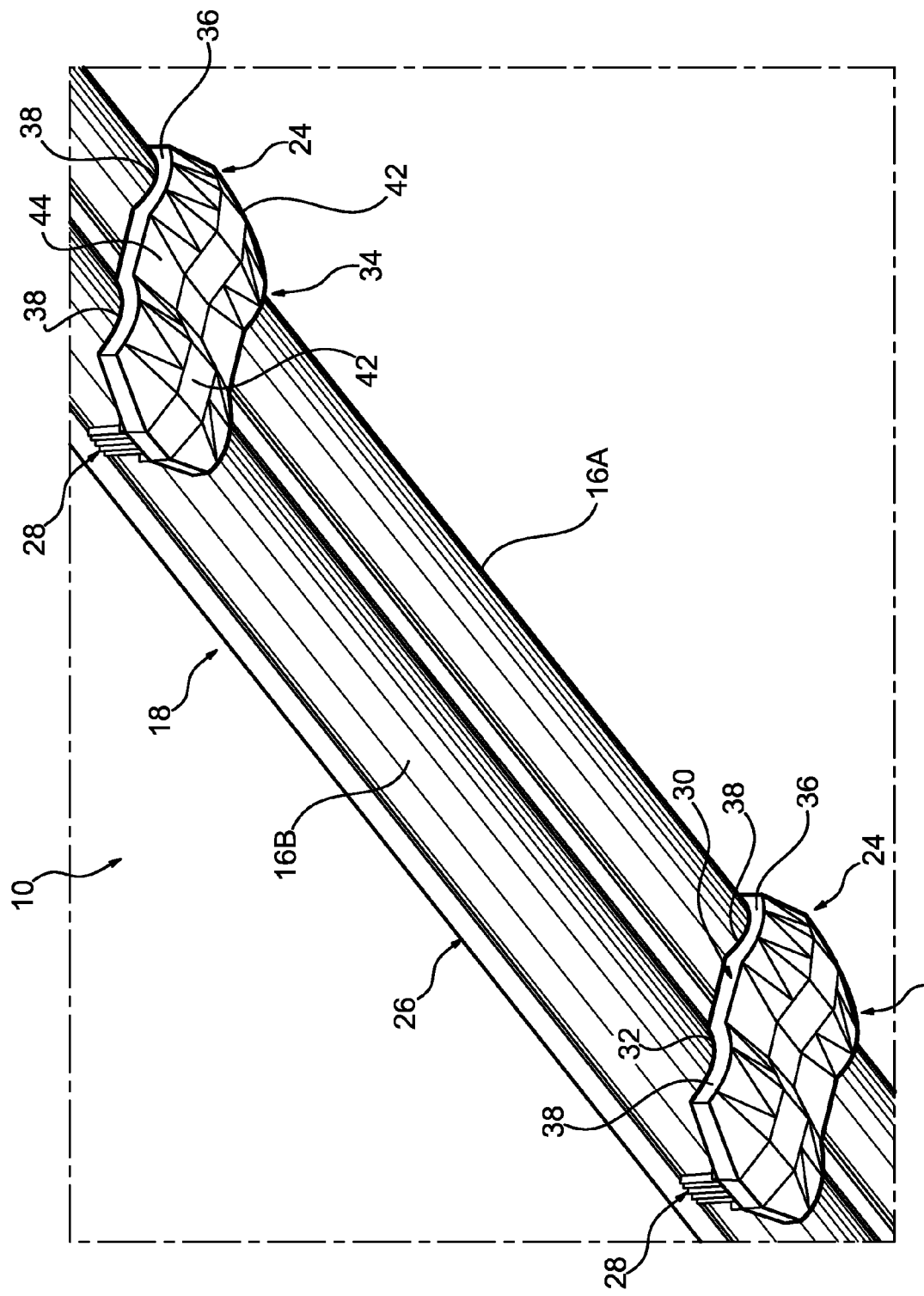
FIG. 2 is a bottom view of the device of FIG. 1.

In the example illustrated in FIG. 1, the transport assembly 10 includes two parallel transport pipes 16A, 16B, the pipe 16B having a diameter smaller than that of the pipe 16A.

More generally, the transport assembly 10 can comprise a single pipe 16A, or more than two pipes.

Each transport pipe 16A, 16B inwardly defines a fluid circulation passage 20. This passage 20 is connected upstream to the production assembly and downstream to a riser pipe for continuously transporting fluid between the production assembly and a surface recovery facility.

The pipe 16A, 16B can be based on an assembly of simple metal tubes or can be based on an assembly of metal tubes covered with a layer of thermal insulation which in turn may be covered with a polymer sheath.

In this example, the pipe 16A, 16B is a rigid pipe made for example with a base of a metal tube or an assembly of metal tubes.

Each pipe 16A, 16B extends longitudinally along an axis A-A' that is horizontal in the Figures.

In the example shown in FIGS. 1 to 4, each pipe 16A, 16B is formed by a simple tubular wall inwardly delimiting a fluid circulation passage 20.

In one alternative (not shown), the pipe 16A, 16B comprises a dual cylindrical housing delimiting an annular space filled with an insulating material. Alternatively, the pipe 16A, 16B comprises a dual cylindrical housing intended to transport a cryogenic fluid, such as liquefied natural gas (LNG).

The protection device 18 comprises a plurality of ballast and support elements 24 for each pipe 16A, 16B, and for each pipe 16A, 16B, a separate longitudinal protective cover 26 attached on the ballast elements 24 via fastening means 28.

The ballast elements 24 are distributed longitudinally over the length of each pipe 16A, 16B. They are spaced longitudinally apart from each other by a distance of several meters, preferably around ten meters. In this example, each ballast element 24 supports two parallel pipes 16A, 16B.

Each element 24 is formed by a heavy body 30 made with a base of a first material, which is advantageously concrete.

The body 30 delimits an upper support 32 for a pipe, a lower surface 34 placed against the bottom 12 of the body of water 14, and a lateral surface 36 connecting the surfaces 32, 34.

The body 30 has a width, considered perpendicular to axis A-A', larger than the total width of the pipes 16A, 16B.

It has a length, considered parallel to axis A-A', smaller than the length of the interval separating two consecutive ballast elements 24.

The upper surface 32 extends generally horizontally when the lower surface 34 is placed on a horizontal bottom 12.

Figure 3:
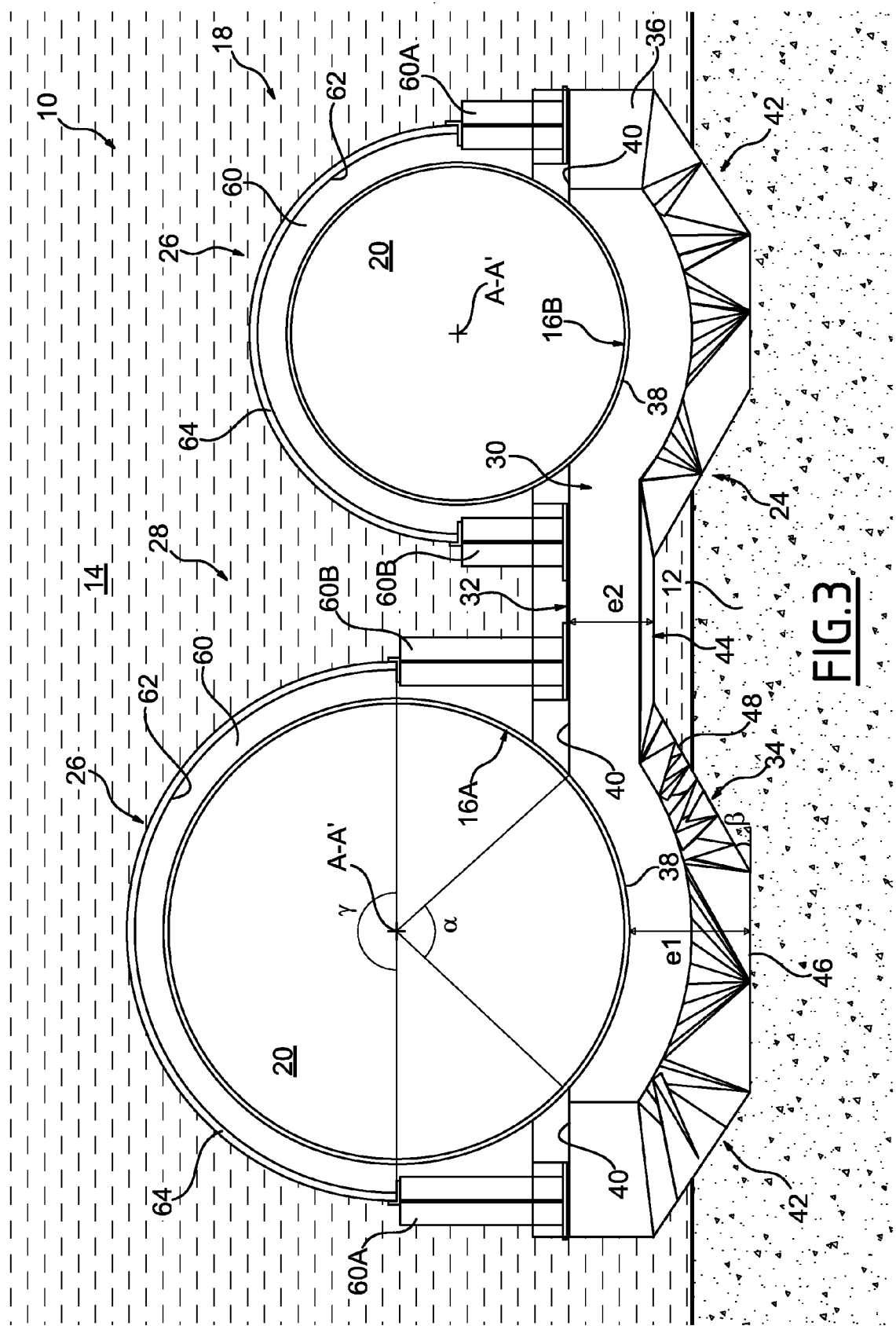
FIG. 3 is a cross-sectional view along vertical plane III of FIG. 1.
Figure 4:
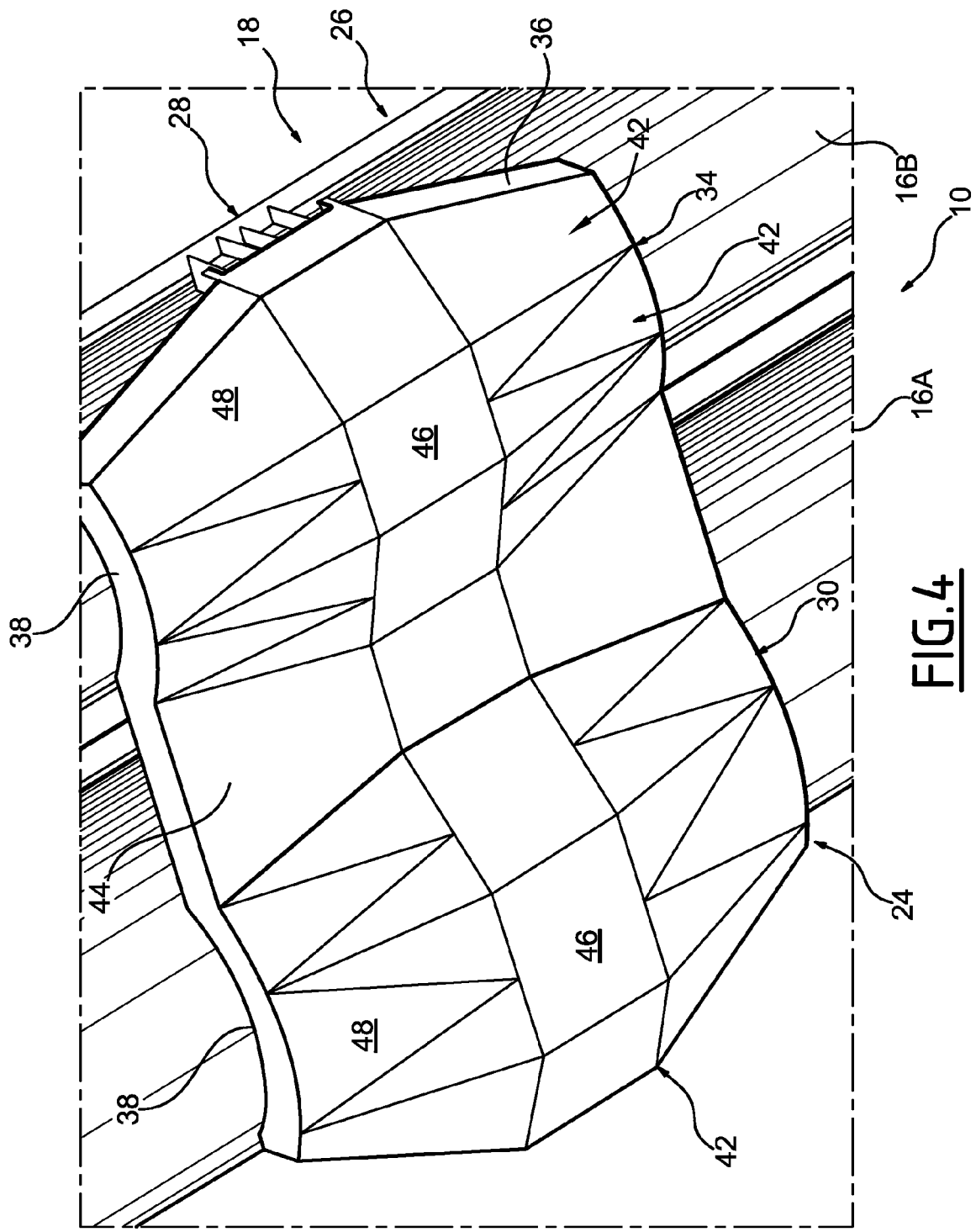
FIG. 4 is a bottom view of a detail of the protection device of FIG. 1.

As illustrated by FIG. 3, the upper surface 32 delimits, for each pipe 16A, 16B, a concave trough 38 for receiving the pipe 16A, 16B, and transversely on either side of each trough 38, flat regions 40 for supporting the fastening means 28.

Each trough 38 emerges longitudinally upstream and downstream of the body 30.

Each trough 38 has a concavity oriented upwardly. In this example, each trough 38 has a transverse section, in a plane perpendicular to axis A-A', substantially in the shape of an arc of circle, with a radius combined with the outer radius of the pipe 16A, 16B that it receives.

The trough 38 extends over an angular sector around the axis A-A', with an angle α greater than 60°, in particular an angle substantially equal to 90° around said axis A-A'.

Thus, when the pipe 16A, 16B is placed in the trough 38, its periphery is in contact with the upper surface 32 in the trough 38 along at least two generatrices of the pipe, along the axis A-A'.

This prevents any untimely transverse movement of the pipe 16A, 16B.

In the example illustrated in FIG. 3, the pipe 16A, 16B is pressed against the upper surface in the trough 38 over substantially the entire angular expanse of the trough 38 around the axis A-A'.

The pipe 16A, 16B protrudes above the body 30 from the upper surface 32 at least over half of its diameter. It is kept completely spaced away from the bottom 12 of the body of water 14 by the ballast elements 24.

The lower surface 34 has a shape adapted to the characteristics of the soil on the bottom 12, as well as the nature of the pipe 16A, 16B.

The lower surface 34 comprises, opposite each trough 38, a curved portion 42 with a convexity oriented downwardly, and, between the curved portions 42, a substantially planar intermediate connecting portion 44.

Each curved portion 42 transversely protrudes downwardly on either side of the intermediate portion 44.

The curved portions 42 thereby delimit a central channel between them with the concavity thereof oriented downward longitudinally emerging on either side of the body 30.

Each curved portion 42 has a substantially planar central region 46, intended to be inserted into the bottom 12 of the body of water 14, and a tilted peripheral region 48 converging toward the upper surface 32 from the central region 46.

The central region 46 extends substantially in a plane parallel to the axis A-A', parallel to the planar region 40 of the upper surface 32.

The distance vertically separating the axis A-A' from the plane of the central region 46 is larger than the distance separating the axis A-A' from the planar region 40.

Furthermore, the thickness e1 of the body 30, considered between the lowest point of the trough 38 and the central region 46, is larger than the thickness e2 of the body, considered between the planar region 40 of the upper surface 32 and the intermediate part 44.

The peripheral region 48 extends to the periphery of the planar region 46. The peripheral region 48 converges toward the upper surface 32 while moving upward from the central region 46, on the one hand laterally and longitudinally toward the lateral surface 34, and on the other hand, laterally toward the intermediate portion 44.

Projecting in a vertical plane, the incline angle β formed between the plane of the central region 46 and the peripheral region 48 is greater than 10°, and is preferably between 10° and 80°.

The presence of the tilted peripheral region 48 around the planar central region 46 facilitates the movement of the transport assembly 10 on the bottom 12 of the body of water 14, in particular when the pipe 16A, 16B is towed, by limiting the resistance to the traction created by the protecting device 18.

The fastening means 28 comprise, for each ballast element 24 and for each pipe 16A, 16B, a pair of opposite anchor blocks 60A, 60B positioned transversely on either side of the trough 38.

The anchor blocks 60A, 60B are advantageously made from metal.

The distance transversely separating the anchor blocks 60A, 60B is greater than the diameter of the pipe 16A, 16B.

A first anchor block 60A is attached on the planar region 40 of the upper surface situated along a lateral edge of the body 30. A second anchor block 60B is attached on the planar region 40 situated opposite the connecting part 44.

The anchor blocks 60A, 60B protrude upward from the upper surface 32.

In this example, the cover 26 associated with each pipe 16A, 16B extends opposite the trough 38 receiving the pipe 16A, 16B. The cover 26 defines, with the trough 38 delimited by the upper surface 32, a passage for receiving the pipe 16A, 16B.

The cover 26 extends away from the pipe 16A, 16B, while delimiting an intermediate space 60 above the pipe 16A, 16B. Advantageously, an elastic material such as rubber, for example, is positioned in the intermediate space 60.

The cover 26 thus covers the pipe 16A, 16B over an angular sector with angle γ, considered around axis A-A', greater than 90° and in particular substantially equal to 180°. It thus substantially covers the region of the pipe 16A, 16B situated above a horizontal plane passing through axis A-A' when the element 24 is placed on a horizontal bottom 12.

In this example, the cover 26 has a wall with a substantially constant thickness in the shape of a cylinder segment cut along a plane parallel to the axis of the cylinder created by the segment.

The cover 26 has a concave inner surface 62 with the concavity thereof oriented downward. Its substantially constant thickness is smaller than the thickness e1 of the body 30 opposite the trough 38.

Thus, projected in a plane perpendicular to axis A-A', the lower surface 62 has a minimum curve radius centered on axis A-A', larger than the maximum curve radius of the pipe 16A, 16B that it covers and larger than the maximum curve radius of the trough 38.

The trough 26 extends longitudinally and parallel to axis A-A' over a length larger than the distance longitudinally separating two ballast elements 24 and over a length greater than the length of each ballast element 24.

It advantageously extends continuously over the entire length of the pipe 16A, 16B placed opposite consecutive ballast elements 24, from a ballast element 24 situated the furthest upstream toward a ballast element 24 situated the furthest downstream.

It extends completely above the upper surface 32 of the ballast elements 24 and above and away from the bottom 12 of the body of water 14.

In this example, the cover 26 is made with a base of a plurality of disconnected cover elements 64, mounted end to end between the consecutive ballast elements 24.

Each cover element 64 thus extends continuously between an upstream end 66 fixed on the fastening means 28 of a first ballast element 24 and a downstream end 68 fixed on the fastening means 28 of a second adjacent ballast element 24. The fixing of the cover 26 on the fastening means 28 is for example done by screwing, riveting or bolting.

Each intermediate ballast element 24 situated between two ballast elements 24 thus bears two adjacent cover elements 64 that are fixed on the ballast element 24 via fastening means 28.

Each cover element 64 is thus suspended by its ends between two adjacent ballast elements 24. Between each pair of adjacent ballast elements 24, the volume delimited under the lower surface 62 in the absence of a pipe 16A, 16B is not covered by a surface secured to a ballast element 24 and is cleared as far as the bottom 12.

The continuous protective cover 26 thus formed is particularly effective to protect the pipe 16A, 16B from falling objects or from impacts caused by underwater operations. When the protective cover 26 advantageously comprises a layer of elastic material in the intermediate space 60, this also makes it possible to effectively absorb energies from high impacts. Furthermore, since the protective cover 26 is not mechanically connected to the rigid pipe 16A, 16B, the appearance of a surface defect, such as a notch, on the wall of the pipe 16A, 16B is considerably reduced. This is a major advantage compared to the protective devices of the prior art, such as concrete coatings, for example.

To that end, the cover 26 is advantageously made from a composite material such as a carbon fiber resin, metal such as steel, or plastic such as GRP (Glass Fiber Reinforced Polyester). It is therefore relatively light while remaining mechanically strong.

The method for assembling and installing the transport assembly 10 on the bottom 12 of the body of water 14 will now be described.

Initially, each pipe 16A, 16B, possibly formed by different tube elements is assembled.

Ballast elements 24 are positioned under each pipe 16A, 16B while being distributed along the pipe 16A, 16B. To that end, each pipe 16A, 16B is inserted into a trough 38 of each ballast element 24 by placing its periphery in contact with the upper surface 32 in the trough 38.

The pipe 16A, 16B is thus positioned between the anchor blocks 60A, 60B and protrudes above the anchor blocks 60A, 60B.

The consecutive cover elements 64 are then assembled end to end by fastening the upstream end 66 of each cover element 64 on the anchor blocks 60A, 60B of a first ballast element 30 and the downstream end 68 of the cover element 64 on the anchor blocks 60A, 60B of an adjacent ballast element.

A continuous protective cover 26 is thus produced between the ballast elements 24 over the entire length of the pipe 16A, 16B to be protected.

The transport assembly 10 thus formed is towed near the bottom of the body of water ("bottom tow"), then is placed on the bottom 12 of the body of water 14. The mass of each ballast element 24, added to the mass of the pipe 16A, 16B, creates pushing into the bottom 12 of the body of water 14, which ensures good stabilization of the pipe.

Once placed on the bottom 12, it is still possible to adjust the position of the pipe 16A, 16B, owing to the advantageous shape of the lower surface 34 of the ballast elements 24, and in particular its tilted lateral regions 48.

The transport assembly 10 according to the invention is therefore particularly simple to assemble and allows an easy installation of at least one pipe 16A, 16B on the bottom 12 of the body of water 14, while offering suitable protection for the pipe 16A, 16B.

Furthermore, the protective cover 26 made up of modules assembled end to end greatly facilitates inspection and maintenance operations for the pipe. In particular, it is very easy to replace one of the component elements of the protective cover 26 if the latter is damaged.

The invention claimed is:

1. A device for protecting at least one pipe located at a bottom of a body of water, the device comprising:
    a plurality of disconnected ballast elements for the pipe arrayed along the pipe, each ballast element having a lower surface for being placed on the bottom of the body of water and an upper surface defining at least one trough for supporting the pipe;
    a top cover for protecting the pipe and connecting at least two of the disconnected ballast elements so as to cover the pipe between the ballast elements; the cover extending opposite the trough for delimiting, with the upper surface of each ballast element, a passage for receiving the pipe;
    the cover has substantially a cylinder section shape with a concavity oriented downward toward the trough;
    the cover has a lower surface opposite the trough, the lower surface having a minimum curve radius larger than a maximum curve radius of an upper surface of the ballast element; and
    wherein the lower surface of at least one ballast element has a convexity oriented downward toward the bottom of the water, and the lower surface of the at least one ballast element has a central region that is substantially parallel to an immobilization axis of the pipe disposed in the ballast element and has at least one peripheral region tilted toward the upper surface moving away from the central region along the immobilization axis.

2. The device according to claim 1, further comprising a fixing device at the at least two ballast elements for fixing the cover on the ballast elements.

3. The device according to claim 1, wherein a region extending between two adjacent ballast elements and below the cover and above the pipe is unoccupied.

4. The device according to claim 1, wherein at least one of the ballast elements includes a base of a first material, and the cover includes a base of a second material.

5. The device according to claim 4, wherein the first material is concrete and the second material is plastic, metallic or composite material.

6. The device according to claim 1, wherein the upper surface of each ballast element delimits at least two of the troughs for each supporting a respective pipe, a top cover opposite each trough for protecting the pipe and connecting at least two disconnected ballast elements to cover the pipe between the ballast elements, the cover extending opposite the trough.

7. The device according to claim 1, wherein the top cover has a plurality of cover elements arranged end to end, each cover element having a first end supported by a first ballast element, and a second end supported by a second ballast element adjacent to the first ballast element.

8. A fluid transport assembly for use on a bottom of a body of water, the assembly comprising:
    at least one rigid fluid transport pipe; and
    the protective device according to claim 1, the pipe being placed in the receiving passage between the cover and each ballast element, and bearing on each ballast element.

9. The assembly according to claim 8, wherein the pipe is pressed on the upper surface of the ballast element while being inserted into each trough, and the top cover being positioned spaced away from the pipe.

10. The assembly according to claim 9, further comprising a layer of elastic material inserted into an intermediate space between the pipe and the top cover.

11. The assembly according to claim 8, wherein the cover angularly upwardly covers the pipe over an angular sector with an angle greater than 90°, around an axis of the pipe.

12. The assembly according to claim 11, wherein the angular sector is with an angle substantially equal to 180° around the axis of the pipe.

13. A device for protecting at least one pipe located at a bottom of a body of water, the device comprising:
    a plurality of disconnected ballast elements for the pipe arrayed along the pipe, each ballast element having a lower surface for being placed on the bottom of the body of water and an upper surface defining at least one trough for supporting the pipe;
    a top cover for protecting the pipe and connecting at least two of the disconnected ballast elements so as to cover the pipe between the ballast elements; the cover extending opposite the trough for delimiting, with the upper surface of each ballast element, a passage for receiving the pipe;
    the cover has substantially a cylinder section shape with a concavity oriented downward toward the trough; and
    the cover has a lower surface opposite the trough, the lower surface having a minimum curve radius larger than a maximum curve radius of an upper surface of the ballast element.

* * * * *